US012698084B2

(12) United States Patent
Obadia

(10) Patent No.: US 12,698,084 B2
(45) Date of Patent: Aug. 4, 2026

(54) SYSTEM FOR DETECTING PRESENCE OF A LIFE VEST IN A LIFE VEST COMPARTMENT

(71) Applicant: Safran Seats, Plaisir (FR)

(72) Inventor: Jean-Marc Obadia, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 19/125,541

(22) PCT Filed: Oct. 24, 2023

(86) PCT No.: PCT/EP2023/079555
§ 371 (c)(1),
(2) Date: Apr. 29, 2025

(87) PCT Pub. No.: WO2024/099759
PCT Pub. Date: May 16, 2024

(65) Prior Publication Data
US 2026/0008545 A1     Jan. 8, 2026

(30) Foreign Application Priority Data

Nov. 7, 2022     (FR) ........................................ 2211549

(51) Int. Cl.
*G08B 21/00*       (2006.01)
*B64D 11/06*       (2006.01)
*B64D 45/00*       (2006.01)
(52) U.S. Cl.
CPC .......... *B64D 11/0631* (2014.12); *B64D 45/00* (2013.01)
(58) Field of Classification Search
CPC ............................ B64D 11/0631; B64D 45/00
(Continued)

(56) References Cited

U.S. PATENT DOCUMENTS

| 11,124,278 B2 * | 9/2021 | Aruga | B64D 11/0631 |
| 11,453,500 B2 * | 9/2022 | Roderwald | B63C 9/23 |

(Continued)

FOREIGN PATENT DOCUMENTS

| EP | 3806054 A1 | 4/2021 |
| FR | 3058124 A1 | 5/2018 |

OTHER PUBLICATIONS

International Application No. PCT/EP2023/079555, International Preliminary Report on Patentability mailed on May 15, 2025, 16 pages (10 pages of Original Document and 6 pages of English Translation).

(Continued)

*Primary Examiner* — Tai T Nguyen
(74) *Attorney, Agent, or Firm* — Kilpatrick Townsend & Stockton LLP

(57)          ABSTRACT

Embodiments disclosed herein relate to assemblies and methods for detecting the presence of a life vest and the opening of a life vest compartment, particularly for transport seating. The system includes electrical contacts located on compartment components and, in some embodiments, on the life vest, arranged to establish an electrical circuit when the compartment is closed and the vest is correctly positioned. A detection module monitors continuity within the circuit and signals any break that indicates compartment opening or removal of the vest. Status information can be transmitted to a control device through wired or wireless communication links, with optional visual or audio alerts upon detection of a change in state. Integration of the detection system with compartment closure mechanisms allows for non-intrusive, automated monitoring. This approach reduces manual inspection time, minimizes human error, and supports efficient compliance with safety requirements for emergency equipment storage and readiness.

10 Claims, 5 Drawing Sheets

(58) Field of Classification Search
USPC .......................................................... 340/945
See application file for complete search history.

(56) References Cited

U.S. PATENT DOCUMENTS

| | | |
|---|---|---|
| 2017/0225790 A1* | 8/2017 | Ball ........................ B65D 33/34 |
| 2019/0016462 A1* | 1/2019 | White ................. A45C 13/1053 |
| 2019/0077559 A1* | 3/2019 | Lumsden ............. B65D 55/026 |
| 2019/0225341 A1* | 7/2019 | Flinn .................. B64D 11/0631 |
| 2020/0070772 A1 | 3/2020 | Kim et al. |
| 2021/0107659 A1* | 4/2021 | Steinmeyer ........ G08B 13/1481 |
| 2022/0144437 A1 | 5/2022 | Newbold |

OTHER PUBLICATIONS

International Appl. No. PCT/EP2023/079555, International Search Report and Written Opinion with English Translations, dated Jan. 12, 2024, 18 pages.

* cited by examiner

[Fig 1]
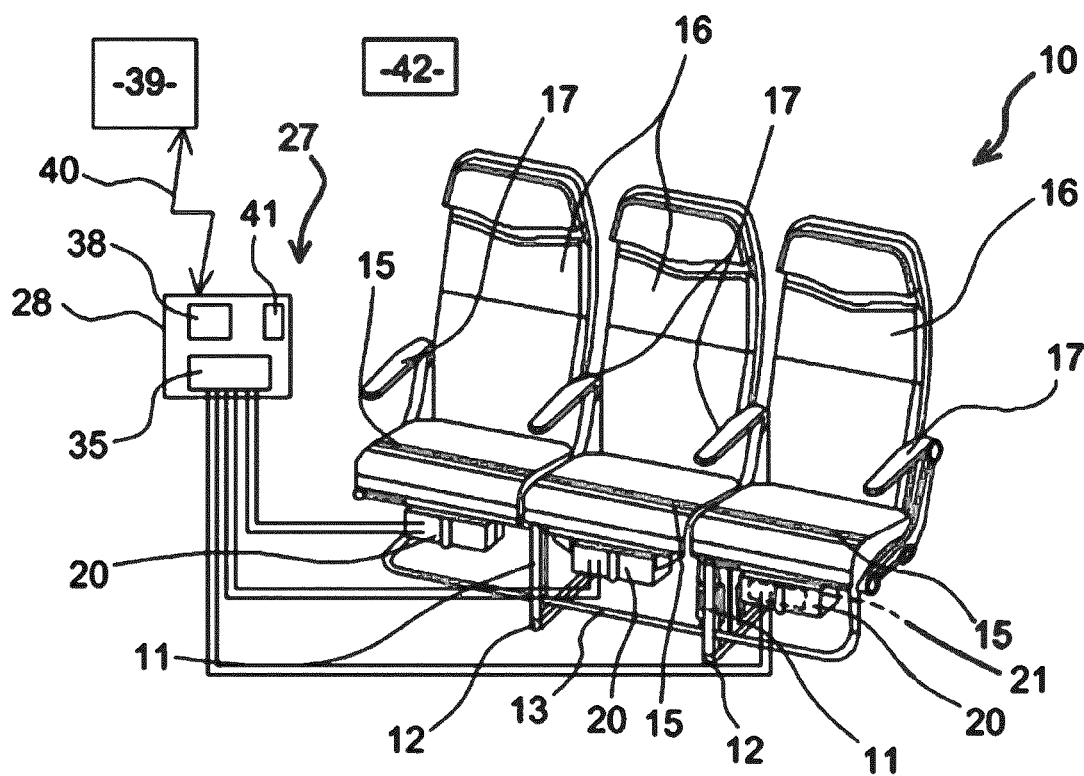
[Fig 2]
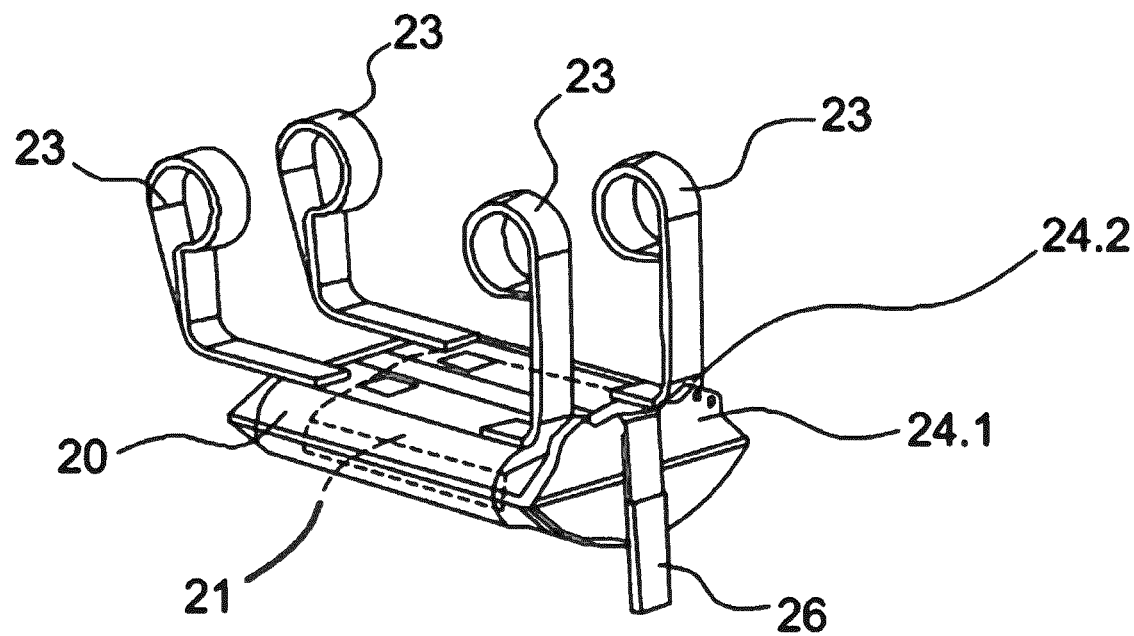

[Fig 3]
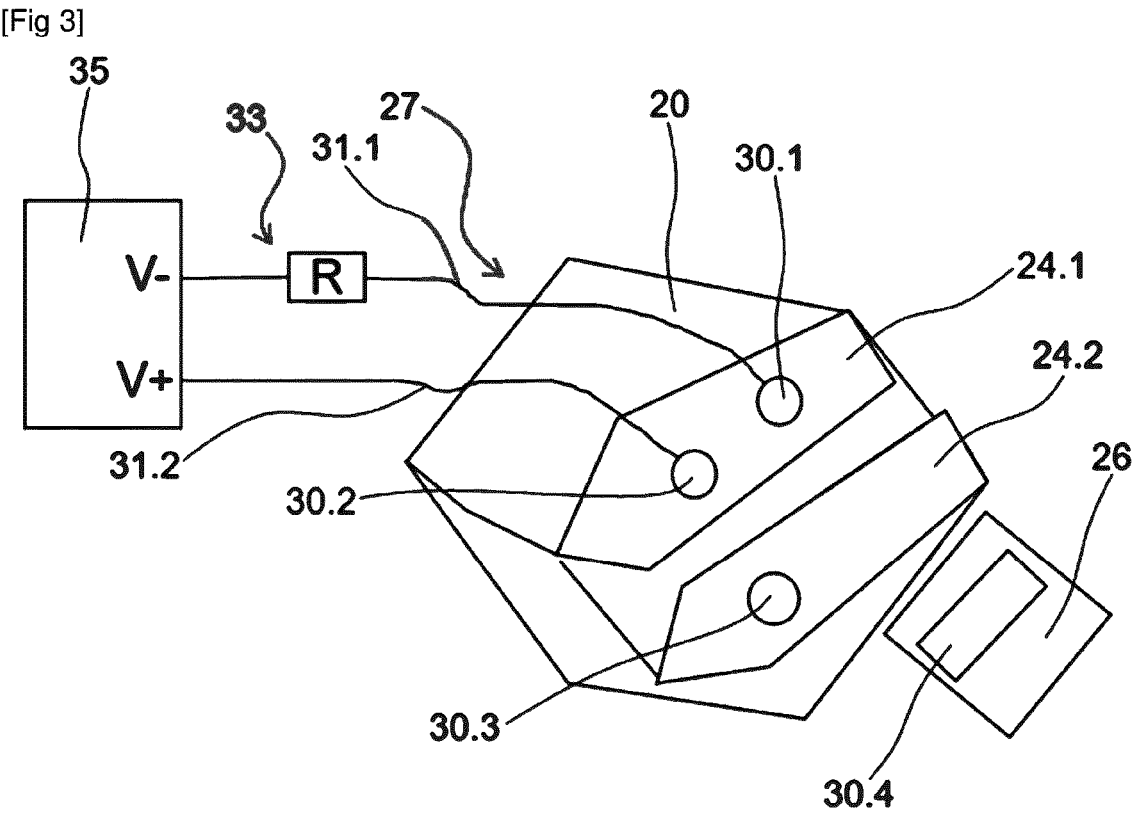
[Fig 4a]
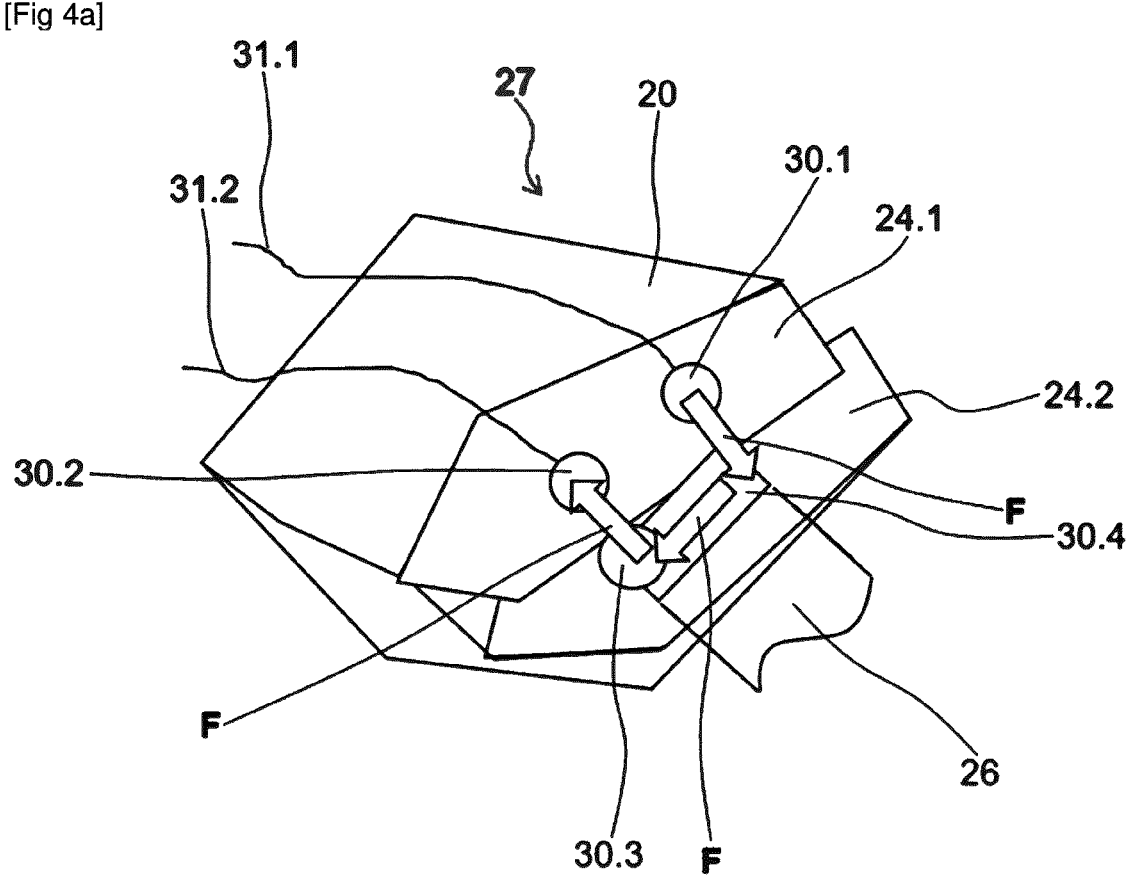

[Fig 4b]
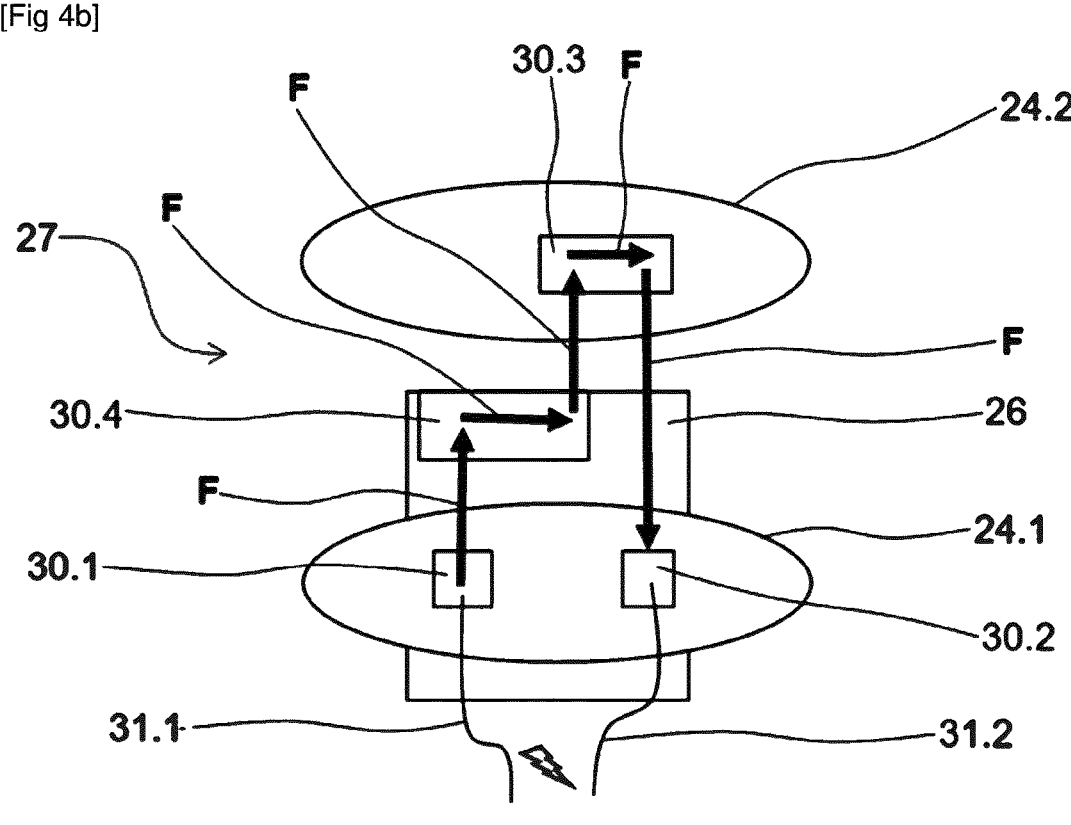
[Fig 5a]
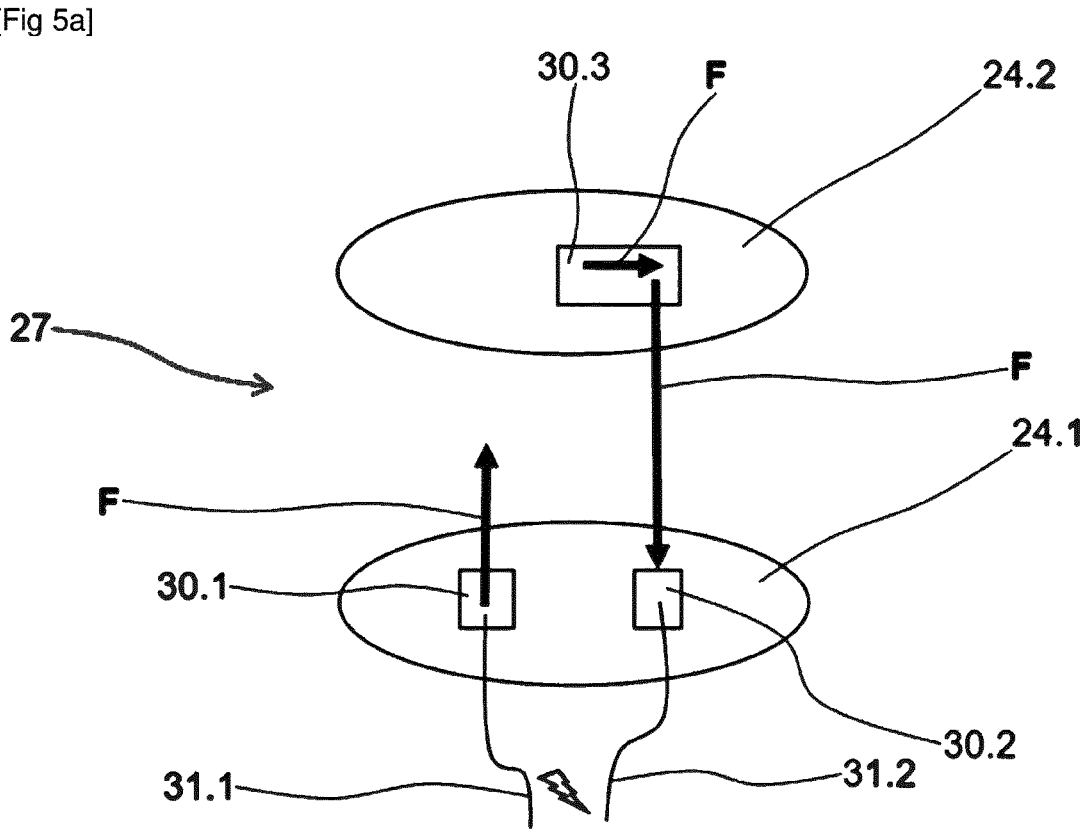

[Fig 5b]
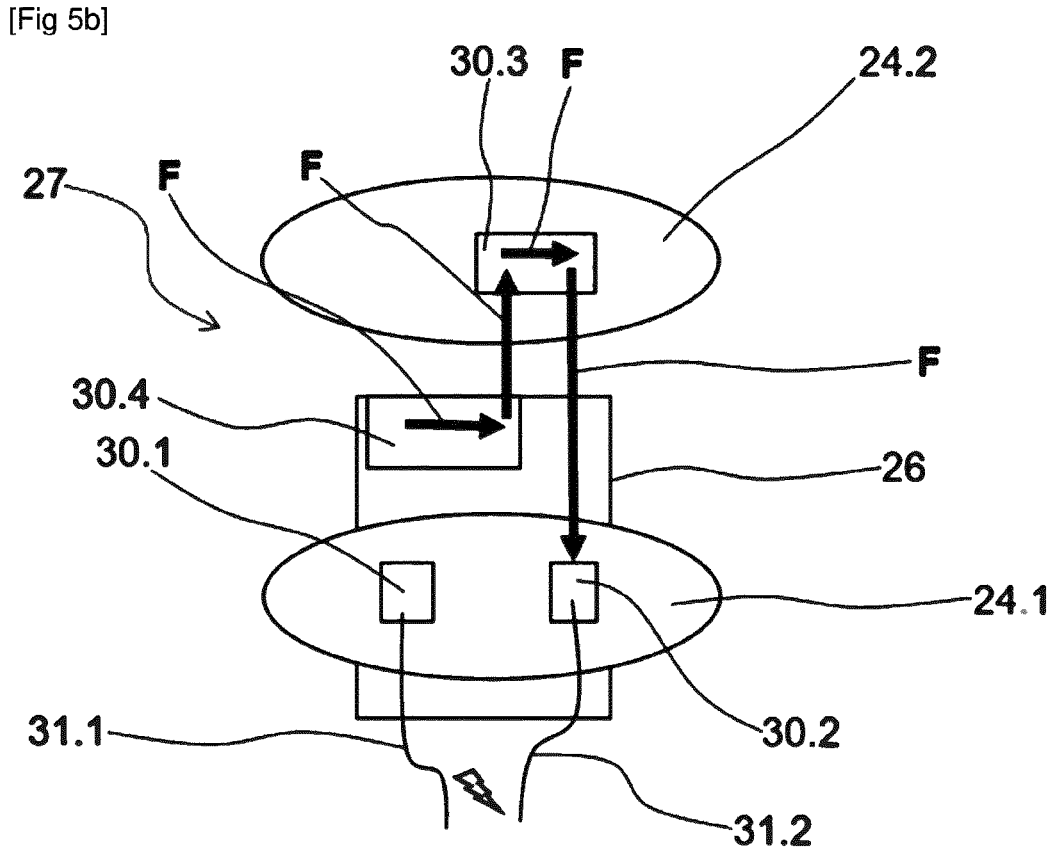
[Fig 5c]
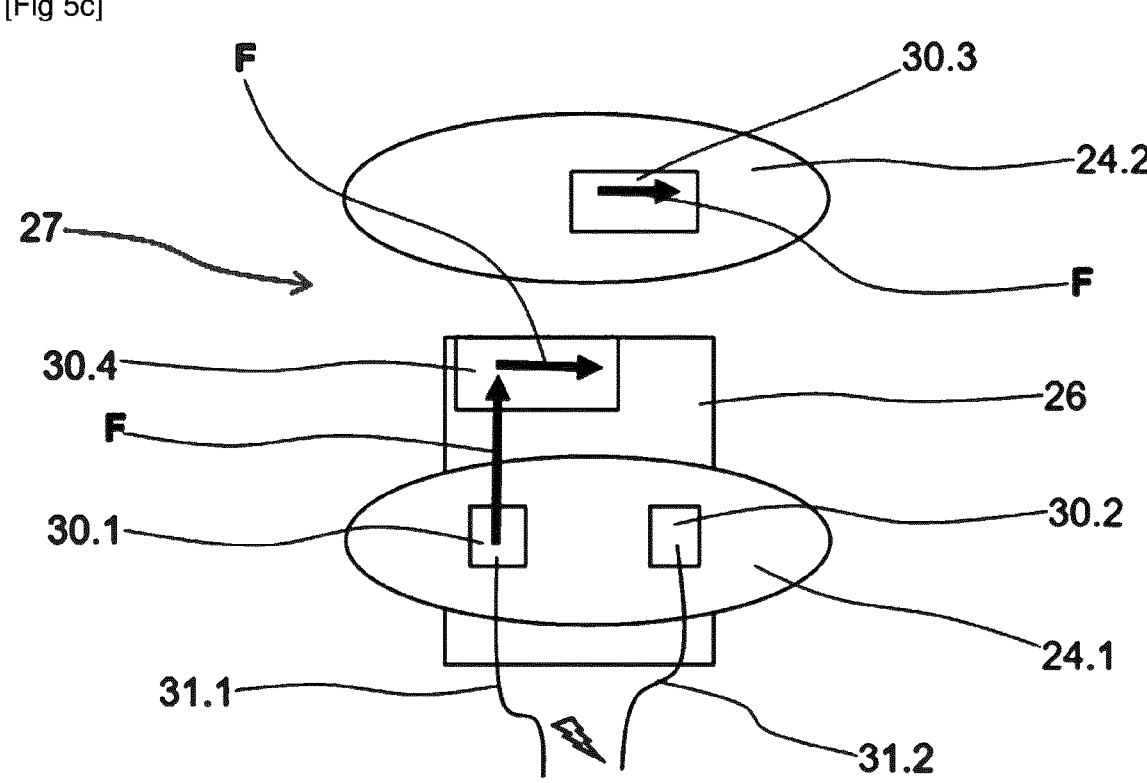

SYSTEM FOR DETECTING PRESENCE OF A LIFE VEST IN A LIFE VEST COMPARTMENT

CROSS REFERENCE TO RELATED APPLICATIONS

This application is a U.S. national phase under 35 U.S.C. § 371 of International Patent Application No. PCT/EP2023/079555, filed on Oct. 24, 2023, which claims priority to French Patent Application No. 2211549, filed on Nov. 7, 2022, the entire contents of both of which are incorporated herein by reference in their entireties.

TECHNICAL FIELD OF THE DISCLOSURE

The present invention relates to a system for detecting the presence of a life jacket and/or the opening a life jacket compartment. The invention finds a particularly advantageous application with life jacket compartments used with aircraft seats. The invention can also be implemented with life jacket compartments used with seats in other means of transport, in particular seats in boats.

BRIEF SUMMARY OF THE DISCLOSURE

Safety constraints dictate that it is not possible to access the life jacket in a compartment without breaking a seal. The presence of the seal ensures that a life jacket is present in good working order and the life jacket compartment has not been opened. Otherwise, there is a risk that the life jacket has been damaged and/or that an object may have been introduced into the life jacket compartment.

The presence of life jackets for each seat on an aircraft and the integrity of the seals are generally checked by flight crew before any boarding. However, such visual checks are time-consuming. In addition, there are possibilities of errors linked to such visual checks by a human being.

The objective of the invention is to effectively remedy these drawbacks by proposing an assembly comprising:
  a life jacket, and
  a life jacket compartment delimiting an internal space for receiving the life jacket, said life jacket compartment comprising a first part and a second part, said life jacket compartment being capable of getting into a closed state in which the first part and the second part are pressed against each other and an open state in which the first part and the second part are moved apart from each other in order to allow extraction of the life jacket,
  said assembly further comprising a detection system comprising:
  at least two electrical contacts respectively on the first part and the second part so as to establish an electrical connection between them when the life jacket compartment is in the closed state, and
  a detection module able to detect a break in the electrical connection between the electrical contacts.

The invention thus proposes a non-intrusive, ergonomic, and autonomous system for monitoring the state of the life jacket compartment. The invention permits to significantly reduce the duration of the verification protocol due to the automation of the checking procedure.

According to one embodiment of the invention, the life jacket further comprises an electrical contact arranged to establish an electrical connection with the electrical contacts on the parts, when the life jacket is arranged inside the internal space of the life jacket compartment and the life jacket compartment is in the closed state.

According to one embodiment of the invention, said assembly comprises:
  a first electrical contact and a second electrical contact respectively connected to an electrical wire of an electrical detection circuit, said first electrical contact and said second electrical contact being arranged on the first part,
  a third electrical contact arranged on the second part, and
  a fourth electrical contact arranged on the life jacket,
  so that when the life jacket is placed inside the internal space in the compartment and the life jacket compartment is in the closed state, an electrical connection is established between the first electrical contact of the first part and the fourth electrical contact of the jacket, and between the fourth electrical contact of the jacket and the third electrical contact on the second part, and between the third electrical contact on the second part and the second electrical contact on the first part.

According to one embodiment of the invention, the electrical contacts are integrated on strips provided with hooks and/or loops for cooperating with each other in order to keep the life jacket compartment in the closed state.

According to one embodiment of the invention, the electrical contacts comprise magnets for cooperating with each other in order to keep the life jacket compartment in the closed state.

According to one embodiment of the invention, said assembly further comprises a communication module able to transmit an information about a state of the electrical connection between the electrical contacts.

According to one embodiment of the invention, said assembly comprises a control device able to display a state of the electrical connection between the electrical contacts corresponding to a seat position as a function of the piece of information received from the communication module via a communication link.

According to one embodiment of the invention, the communication link is a wireless connection.

According to one embodiment of the invention, said assembly comprises an alert system able to generate a light and/or sound signal when the detection module has detected a break in the electrical connection.

The invention also relates to a seat comprising at least one assembly as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

BRIEF DESCRIPTION OF THE FIGURES

FIG. 1 is a perspective view of an aircraft seat with a multiple seating capacity equipped with a system for detecting the presence of life jackets and/or the opening of the life jacket compartments according to the invention;

FIG. 2 is a perspective view of a life jacket compartment containing one life jacket;

FIG. 3 is a schematic representation of a life jacket compartment provided with a system for detecting the presence of a life jacket and/or the opening of a life jacket compartment according to the invention;

FIGS. 4a and 4b are schematic representations illustrating the passage of electric current inside the electrical contacts of the detection system according to the invention when the life jacket is present inside the compartment and the compartment containing the life jacket is in the closed state;

FIGS. 5a, 5b, and 5c are schematic representations illustrating electrical connection breaks for different scenarios of life jacket removal and/or life jacket compartment opening;

FIGS. 6a and 6b are schematic representations of alternative embodiments of a system for detecting the presence of a life jacket and/or the opening of a life jacket compartment according to the invention.

It should be noted that, in the figures, the structural and/or functional elements common to the different embodiments have the same references. Thus, unless otherwise stated, such elements have identical structural, dimensional and material properties.

DETAILED DESCRIPTION

FIG. 1 shows an economy class seat 10 to be fixed on rails (not shown) mounted on a floor of an aircraft cabin. For this purpose, the seat 10 comprises legs 11 provided with fasteners 12 configured to cooperate with rails. A luggage bar 13 permits to retain the luggage under the seat 10.

The seat 10 comprises several seating pans 15 and several backrests 16 so as to define several seating places. Each backrest 16 can be mounted fixed or reclining backwards relative to the corresponding seating pan 15. The seat 10 also comprises armrests 17 which can be retractable or not.

A life jacket compartment 20 also visible in FIG. 2 and containing a life jacket 21 is arranged under the seating pan 15 of each place of the seat 10.

The life jacket compartment 20 may comprise straps 23 for attaching the life jacket compartment 20 to a structure of the seat 10.

The life jacket compartment 20 delimits an internal space inside which the life jacket 21 is arranged. The life jacket compartment 20 is provided with a first flap 24.1 and a second flap 24.2 on the side of its end opening outwards. The life jacket compartment 20 can take a closed state in which the first flap 24.1 and the second flap 24.2 are pressed against each other and an open state in which the first flap 24.1 and the second flap 24.2 are separated from each other in order to allow the extraction of the life jacket 21.

The life jacket 21 is provided with a strap 26 which protrudes from the life jacket compartment 20. In an emergency situation, the passenger can grasp and pull on the strap 26 between the two flaps 24.1, 24.2, which has the effect of opening the life jacket compartment 20 and removing the life jacket 21 from said compartment 20.

A detection system 27 comprises a control box 28 electrically connected to several sets of electrical contacts each associated with a life jacket compartment 20 of a place of seat 10. Thus, in a so-called "centralized" configuration, a control box 28 is common to several places of seat 10, or even to several seats 10. In a so-called "individualized" configuration, a control box 28 is associated with each place of seat 10.

More specifically, as illustrated in FIG. 3, the detection system 27 comprises a first electrical contact 30.1 and a second electrical contact 30.2 each connected respectively to an electrical wire 31.1, 31.2 of an electrical detection circuit 33. The first electrical contact 30.1 and the second electrical contact 30.2 are arranged on the first flap 24.1. A third electrical contact 30.3 is arranged on the second flap 24.2. A fourth electrical contact 30.4 is arranged on the strap 26 of the life jacket 21. The fourth electrical contact 30.4 is provided for establishing an electrical connection between the first electrical contact 30.1 of the first flap 24.1 and the third electrical contact 30.3 of the second flap 24.2 when the strap 26 is interposed between the flaps 24.1 and 24.2.

The control box 28 comprises a detection module 35 able to detect a break in the electrical connection between the electrical contacts 30.1-30.4. The detection module 35 takes, for example, the form of a microcontroller comprising a microprocessor associated with at least one memory. The detection module 35 is able to detect the continuity of the current inside the electrical detection circuit 33 comprising the two electrical wires 31.1, 31.2 connected to one another via the electrical contacts 30.1-30.4. The electrical detection circuit 33 may be a simple circuit comprising, for example, a resistor R mounted between a positive electrical potential V+ and a negative electrical potential V− as well as the electrical contacts 30.1-30.4 electrically mounted in series inside the electrical detection circuit 33.

As illustrated in FIGS. 4a and 4b, when the life jacket 21 is disposed within the internal space in the life jacket compartment 20 and the life jacket compartment 20 is in a closed state, an electrical connection is established between the first electrical contact 30.1 of the first flap 24.1 and the fourth electrical contact 30.4 of the strap 26, then between the fourth electrical contact 30.4 of the strap 26 and the third electrical contact 30.3 on the second flap 24.2 and between the third electrical contact 30.3 on the second flap 24.2 and the second electrical contact 30.2 on the first flap 24.1.

The electrical detection circuit 33 is then in a closed state due to the electrical continuity between the electrical contacts 30.1-30.4, which is illustrated by the arrows F in FIGS. 4a and 4b. The detection module 35 then detects a current inside the electrical detection circuit 33 (and therefore no break in the electrical connection between the electrical contacts 30.1-30.4), which means that the life jacket 21 is arranged inside the internal space in the life jacket compartment 20 and that the life jacket compartment 20 is in a closed state.

When the life jacket 21 is absent from the life jacket compartment 20 and/or the life jacket compartment 20 is in an open state, a connection break occurs between the electrical contacts 30.1-30.4, which is detected by the detection module 35. Indeed, the connection break between the electrical contacts 30.1-30.4 causes a power cut inside the electrical detection circuit 33, which is detected by the detection module 35.

FIG. 5a illustrates a break in the connection between the electrical contacts 30.1-30.4 observable when the life jacket 21 is absent from the life jacket compartment 20. The arrows F thus illustrate the break in the electrical connection between the first electrical contact 30.1 of the first flap 24.1 and the third electrical contact 30.3 of the second flap 24.2, which was previously established by the fourth electrical contact 30.4 arranged on the strap 26 of the life jacket 21.

FIG. 5b illustrates a break in the connection between the electrical contacts 30.1-30.4 observable when the first flap 24.1 is moved away from the "second flap 24.2-strap 26" assembly. The arrows F thus illustrate the break in the electrical connection between the first electrical contact 30.1 of the first flap 24.1 and the fourth electrical contact 30.4 on the strap 26 of the life jacket 21.

FIG. 5c illustrates a break in the connection between the electrical contacts 30.1-30.4 observable when the second flap 24.2 is moved away from the "first flap 24.1-strap 26" assembly. The arrows F thus illustrate the break in the electrical connection between the third electrical contact

30.3 of the second flap 24.2 and the fourth electrical contact 30.4 on the strap 26 of the life jacket 21.

Thus, when the detection module 35 detects a power cut inside the electrical detection circuit 33 and therefore a break in the electrical connection between the electrical contacts 30.1-30.4, this means that the life jacket 21 is absent from the life jacket compartment 20 and/or that the life jacket compartment 20 is in an open state.

Alternatively, the presence of the life jacket 20 may be detected by means of a fourth electrical contact 30.4 at a location on the life jacket other than the strap 26. In this case, the fourth electrical contact 30.4 preferably remains in proximity to the flaps 24.1, 24.2 in order to establish the desired electrical connections with the other electrical contacts.

Preferably, as can be seen in FIG. 1, the control box 28 further comprises a communication module 38 able to transmit an information relating to a state of the electrical connection between the electrical contacts 30.1-30.4. This piece of information is representative of a state (open or closed) of the life jacket compartment 20 and/or the life jacket 21 (present or absent).

A control device 39 is able to display a state of the electrical connection (established or broken) between the electrical contacts 30.1-30.4 corresponding to a place of seat 10 based on the information received from the communication module 38 via a communication link 40. Advantageously, the communication link 40 is a wireless link. The wireless link may be a WI-FI, Bluetooth (trade name), ZigBee (trade name) type link, or any other type of wireless link suitable for the application.

Alternatively, the communication link 40 is a wired link.

Advantageously, the control device 39 is a control screen inside the aircraft cabin. The control screen is arranged for example inside a space dedicated to flight personnel. Preferably, the control screen is also able to display a location corresponding to the places of seat 10 of the aircraft depending on the state of the corresponding electrical connection of the detection system 27. Alternatively, the control device 39 is a dedicated portable system, for example of the tablet, mobile phone, connected watch type, or more generally any portable digital device suitable for the application.

The detection module 35 and the communication module 38 are integrated into the control box 28. The control box 28 is powered by at least one energy source 41. The energy source 41 advantageously takes the form of batteries or a rechargeable battery. In the case where the communication link 40 is a wireless link, the control box 28 can be powered by any energy recovery system based on the use of radio waves, vibrations, or solar energy with or without an on-board battery. Alternatively, the energy source 41 takes the form of an electrical network of the aircraft to which the control box 28 is connected.

Alternatively or additionally, it is possible to provide a system alert system 42 able to generate a light and/or sound signal when the detection module 35 has detected a break in the electrical connection. The alert system 42 may be provided inside the aircraft cabin at the level of the places of seat 10. It is in particular possible to use the lamps currently dedicated to locate the row of the passenger who has called the flight crew.

Advantageously, the electrical contacts 30.1-30.4 are integrated on strips provided with hooks and/or loops for cooperating with each other in order to keep the life jacket compartment 20 in the closed state. Preferably, these strips are of the Velcro type (trade name).

According to an exemplary embodiment, the first electrical contact 30.1 on the first flap 24.1 is integrated on a strip provided with hooks. The second electrical contact 30.2 on the first flap 24.1 is integrated on a strip provided with loops. The third electrical contact 30.3 on the second flap 24.2 is integrated on a strip provided with hooks. The fourth electrical contact 30.4 on the strap 26 is integrated on a strip provided with loops. For this purpose, the strips provided with loops and/or hooks are covered with a layer of electrically conductive material, such as copper, forming the electrical contact.

Alternatively, the electrical contacts 30.1-30.4 comprise magnets for cooperating with each other in order to maintain the life jacket compartment 20 in the closed state. The magnets may be covered with a layer of electrically conductive material, such as copper, forming the electrical contact. In the case where the magnets are made of an electrically conductive material, it is not necessary to cover them with an additional layer of electrically conductive material.

Alternatively, the electrical contacts 30.1-30.4 are integrated on snap fasteners made of metal or any other device allowing removable holding of elements together and having good electrical conductivity.

Alternatively, electrical contacts 30.1-30.4 are dry contacts comprising an element in the form of a thin plate made of an electrically conductive material. The function of maintaining the life jacket compartment 20 in the closed state is then ensured by removable fixing members between the flaps 24.1, 24.2, such as Velcro type strips (trade name) or magnets, which then do not intervene in establishing the electrical connection between the electrical contacts 30.1-30.4 of the electrical detection circuit 33.

Figures 6A, 6B:
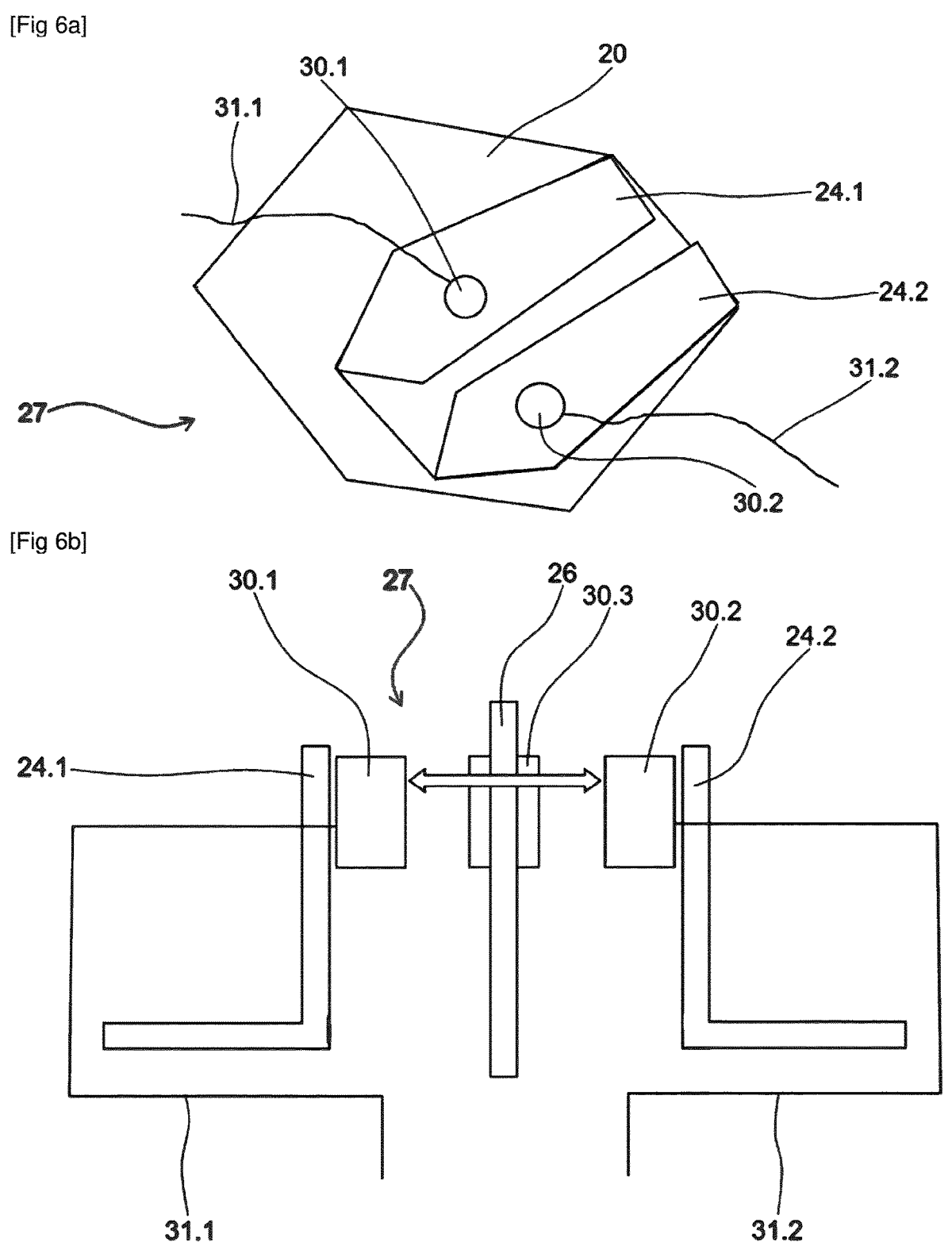

According to the embodiment of the invention shown in FIG. 6a, the detection system 27 comprises only a first electrical contact 30.1 on the first flap 24.1 and a second electrical contact 30.2 on the second flap 24.2.

When the life jacket compartment 20 is in the closed state, the first electrical contact 30.1 and the second electrical contact 30.2 establish an electrical connection between them.

When the life jacket compartment 20 is opened, a connection break occurs between the first electrical contact 30.1 and the second electrical contact 30.2, which is detected by the detection module 35.

Such an embodiment permits to detect only the opening of the life jacket compartment 20 but not the presence or absence of the life jacket 21 inside the compartment.

According to the embodiment in FIG. 6b, the detection system 27 comprises a first electrical contact 30.1 comprising a magnet on the first flap 24.1 and a second electrical contact 30.2 comprising a magnet on the second flap 24.2. A third electrical contact 30.3 comprising a magnet is arranged on the strap 26 of the life jacket 21.

When the life jacket compartment 20 is in the closed state and the life jacket 21 is inside the life jacket compartment 20, the first electrical contact 30.1, the second electrical contact 30.2, and the third electrical contact 30.3 establish an electrical connection with each other.

When the compartment is in the open state and/or the life jacket 21 is removed from the compartment 20, a break in the connection occurs between the electrical contacts, which is detected by the detection module 35.

In the previously described embodiments, the two flaps 24.1, 24.2 together form a door. In other embodiments, the life jacket compartment 20 comprises a single flap 24.1 or 24.2 for closing the compartment 20 by placing itself directly on a portion of the body of the compartment 20. According to these alternative embodiments, the compartment 20 has not therefore any second flap.

Of course, the different characteristics, variants and/or embodiments of the present invention may be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. An assembly comprising:
a life jacket;
a life jacket compartment delimiting an internal space for receiving the life jacket, said life jacket compartment comprising a first part and a second part, wherein, when the life jacket compartment is in a closed state, the first part and the second part are pressed against each other, and when the life jacket compartment is in an open state, the first part and the second part are moved apart from each other in order to allow extraction of the life jacket; and
a detection system comprising:
at least two electrical contacts respectively on the first part and the second part so as to establish an electrical connection between them when the life jacket compartment is in the closed state; and
a detection module able to detect a break in the electrical connection between the electrical contacts, and wherein the life jacket further comprising an electrical contact arranged to establish an electrical connection with the electrical contacts on the parts, when the life jacket is inside the internal space in the life jacket compartment and the life jacket compartment is in the closed state.

2. The assembly according to claim 1 comprising:
a first electrical contact and a second electrical contact each connected to an electrical wire of an electrical detection circuit, said first electrical contact and said second electrical contact being on the first part;
a third electrical contact on the second part; and
a fourth electrical contact on the life jacket, such that, when the life jacket is inside the internal space in the compartment and the life jacket compartment is in the closed state, an electrical connection is established between the first electrical contact of the first part and the fourth electrical contact of the jacket, and between the fourth electrical contact of the jacket and the third electrical contact on the second part, and between the third electrical contact on the second part and the second electrical contact on the first part.

3. The assembly according to claim 1 wherein the electrical contacts are integrated on strips provided with hooks or loops for cooperating with each other to keep the life jacket compartment in the closed state.

4. The assembly according to claim 1 wherein the electrical contacts comprise magnets for cooperating with each other to keep the life jacket compartment in the closed state.

5. The assembly according to claim 1 further comprising a communication module able to transmit information relating to a state of the electrical connection between the electrical contacts.

6. The assembly according to claim 5, further comprising a control device able to display a state of the electrical connection between the electrical contacts corresponding to a place of seat as a function of the information received from the communication module via a communication link.

7. The assembly according to claim 6, wherein the communication link is a wireless link.

8. The assembly according to claim 1, further comprising an alert system able to generate a light and/or sound signal when the detection module has detected a break in the electrical connection.

9. A seat comprising at least one assembly according to claim 1.

10. The assembly according to claim 1, wherein the electrical contacts are integrated on strips provided with hooks and loops for cooperating with each other to keep the life jacket compartment in the closed state.

* * * * *